Figure 1:
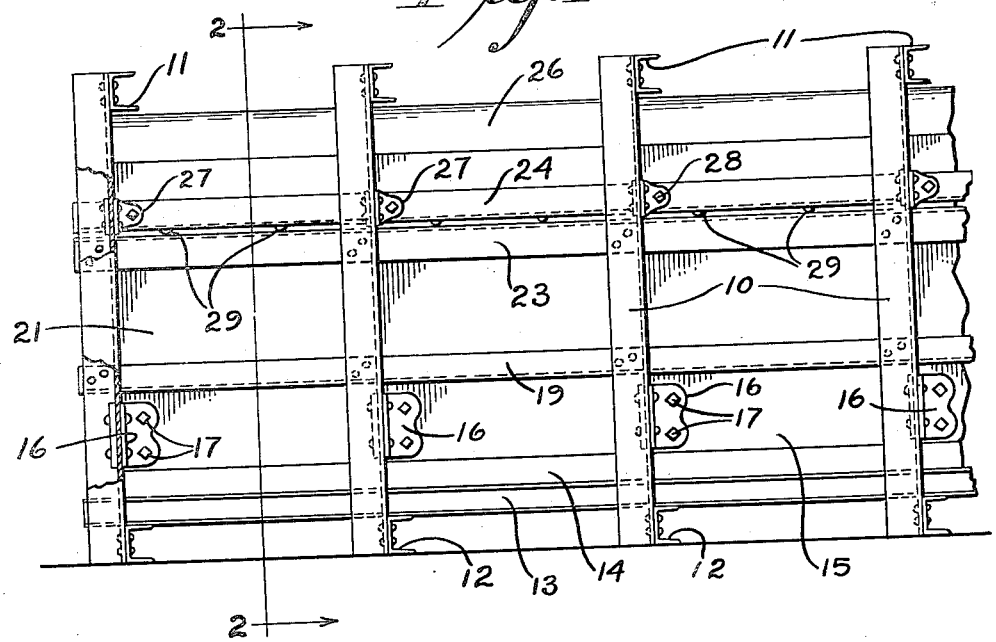

Jan. 28, 1936.   C. A. BOWEN   2,029,052

FURNACE

Filed Nov. 10, 1933

INVENTOR.
CLINTON A. BOWEN

BY Dorsey & Cole
ATTORNEYS.

Patented Jan. 28, 1936

2,029,052

UNITED STATES PATENT OFFICE 2,029,052

FURNACE

Clinton A. Bowen, Corning, N. Y., assignor to Corning Glass Works, Corning, N. Y., a corporation of New York Application November 10, 1933, Serial No. 697,501

2 Claims. (Cl. 263—46)

This invention relates to furnaces and more particularly melting furnaces such as are used for melting glass.

Due to the tremendous heats necessarily employed for melting the constituents used in making glass and the consequent excessive expansion and contraction of the furnace walls and their supports, much difficulty is experienced in maintaining proper alignment of the refractories from which the furnace walls are made. Moreover, due to the lack of mechanical strength of the refractories ordinarily employed in the glass art, much steel is used in and about glass melting furnaces as the skeleton supports for the refractories. This further complicates the situation as the coefficients of expansion of metals is so much greater than those of refractories commonly employed that constant watch must be maintained and adjustments must be continually made in the furnace structure to compensate for the expansion differences in the materials going to make up the furnace.

The object of the present invention is to facilitate the making of adjustments on a furnace as expansion or contraction of its component parts takes place.

The above and other objects may be accomplished by employing my invention which embodies among its features a rectangular metal frame carrying brackets upon which the refractories forming the side walls and cap of the furnace are independently supported and adjustable members carried by the frame for compensating for the differences of expansion and contraction of the metal and refractory parts.

Figure 2:
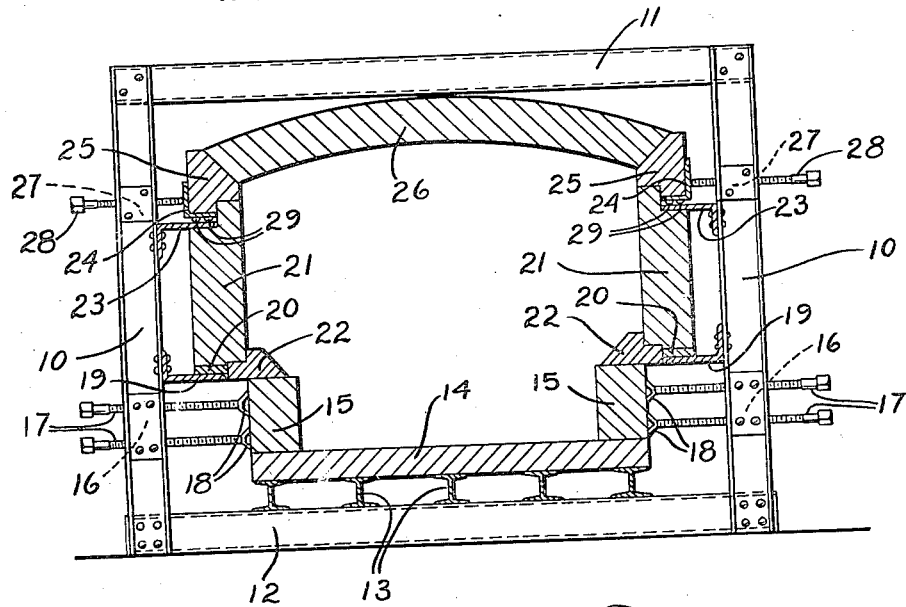

In the drawing:

Fig. 1 is a side view of a furnace constructed in accordance with this invention; and Fig. 2 is a transverse sectional view taken on the line 2—2 of Fig. 1.

In carrying my invention into practice I construct a plurality of rectangular frames consisting of standards 10 which are held in spaced parallel relation at their upper and lower ends by girders 11 and 12, respectively. Supported on the girders 12 in spaced parallel relation are beams 13 upon which the refractory floor 14 of a glass melting tank is supported. Extending upwardly from the edges of the floor 14 are side blocks 15 and attached to the standards 10 are plates 16 having threaded openings through which screws 17 project. As shown, these screws are provided at their innermost ends with V-shaped fingers 18 which engage the outer faces of the blocks 15 and hold them in proper position on the bottom 14.

Secured to the standards 10 slightly above the uppermost screws 17 are brackets 19 which extend inwardly toward the upper edges of the blocks 15 and supported on these brackets are metal plates 20 carrying side walls 21 of the combustion chamber of the furnace. Tuck stones 22 close the space between the upper edges of the blocks 15 and the lower edges of the side walls 21 and serve to protect the metal parts from the intense heat of the furnace.

Attached to the standards 10 above the brackets 19 are brackets 23 which project inwardly and engage the wall 21 near its upper edge. Supported for sliding movement on the brackets 23 are L-shaped plates 24 upon which the skew back blocks 25 of the furnace cap 26 are supported. Attached to the standards 10 slightly above the brackets 23 are plates 27 having threaded openings through which adjusting screws 28 project. As shown the inner ends of these screws engage the vertical leg of the L-shaped plates 24 so as to compensate for any expansion or contraction of the cap 26. In order to facilitate the free movement of the plates 24 on the brackets 23 I attach to the horizontal leg of each plate 24 rivets 29 the dome shaped heads of which bear on the brackets 23 and permit of relatively free sliding movements between the parts.

In use, as the furnace heats up and expansion of the parts takes place, the screws 17 and 28 may be adjusted to maintain the walls and cap in proper alignment. By employing adjustments for the side blocks 15 which are independent of the adjustments of the cap, I am able to maintain the proper alignment of all of the parts without subjecting them to undue strain and possible injury. Moreover, by employing my construction the removal and replacement of the side walls 21 may be effected without the necessity of disturbing the cap 26 and also the side blocks 15 and bottom 14 or any parts thereof may be wholly removed and replaced without disturbing the side walls 21 and cap 26.

While in the foregoing there has been shown and described the preferred embodiment of my invention, it is to be understood that minor changes in the details of construction, combination, and arrangement of parts may be resorted to without departing from the spirit and scope of my invention as claimed.

What I claim is:—

1. In a glass melting furnace a plurality of vertical standards, girders at the upper and lower ends of the standards, brackets intermediate the ends of the standards, side walls supported on the brackets, brackets on the standards between their upper ends and the first mentioned brackets, a cap, an angle bar along each side of the cap, rivets on each angle bar, said rivets resting on the second mentioned brackets, adjusting screws carried by the standards and engaging the outer side faces of the angle bars, a bottom supported on the girders at the lower ends of the standards, side blocks between the bottom and the lower edges of the side walls and adjusting screws carried by the standards and engaging the side blocks.

2. In combination, a glass melting furnace comprising a tank composed of a bottom and side blocks forming a relatively shallow trough, girders supporting the bottom, standards extending upwardly parallel with the side blocks, brackets on the standards, side walls supported on the brackets independently of the side blocks, brackets on the standards above the first mentioned brackets, a cap supported on the second mentioned brackets independently of the side walls, tuck-stones between the sides of the tank and the side walls and independently adjustable means carried by the standards for holding the side blocks in place against the pressure of the contents of the tank and independently adjustable means carried by the standards for compensating for the expansion and contraction of the cap.

CLINTON A. BOWEN.